United States Patent
Lee (10) Patent No.: US 8,934,120 B2
(45) Date of Patent: Jan. 13, 2015

(54) DLNA (DIGITAL LIVING NETWORK ALLIANCE) DEVICE, METHOD AND SYSTEM FOR PRINTING CONTENT FROM WEB SERVERS

(75) Inventor: Jun-seung Lee, Soengnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 800 days.

(21) Appl. No.: 12/784,017

(22) Filed: May 20, 2010

(65) Prior Publication Data

US 2011/0109934 A1 May 12, 2011

(30) Foreign Application Priority Data

Nov. 6, 2009 (KR) ........................ 10-2009-0107232

(51) Int. Cl.
*G06F 3/12* (2006.01)

(52) U.S. Cl.
CPC ............ *G06F 3/1204* (2013.01); *G06F 3/1237* (2013.01); *G06F 3/1287* (2013.01)
USPC ............ 358/1.15; 400/62; 709/202; 709/225; 715/234; 715/274

(58) Field of Classification Search
USPC ............. 358/1.15, 1.12, 1.13, 1.14, 505, 537; 379/88.13; 400/62; 705/14.64, 14.69; 709/202, 223, 225; 715/234, 274, 744, 715/760
See application file for complete search history.

(56) References Cited

U.S. PATENT DOCUMENTS

| | | | |
|---|---|---|---|
| 6,778,289 B1 * | 8/2004 | Iwata ........................... | 358/1.15 |
| 2001/0037332 A1 * | 11/2001 | Miller et al. ..................... | 707/4 |
| 2002/0026510 A1 * | 2/2002 | Satomi et al. ................. | 709/225 |
| 2002/0036654 A1 * | 3/2002 | Evans et al. ................... | 345/744 |
| 2002/0085224 A1 * | 7/2002 | Price et al. ................... | 358/1.13 |
| 2005/0213152 A1 * | 9/2005 | Suzuki et al. ................ | 358/1.15 |
| 2006/0119885 A1 * | 6/2006 | Jeon et al. .................... | 358/1.15 |
| 2006/0251455 A1 * | 11/2006 | Kim et al. ....................... | 400/62 |
| 2007/0268507 A1 * | 11/2007 | Kim ............................. | 358/1.13 |
| 2008/0163069 A1 * | 7/2008 | Eilers ............................ | 715/744 |

OTHER PUBLICATIONS

Excerpts from DLNA Guidelines (DLNA Networked Device Interoperability Guidelines, Mar. 2006, Digital Living Network Alliance).*

* cited by examiner

*Primary Examiner* — David S Cammack
(74) *Attorney, Agent, or Firm* — Staas & Halsey LLP

(57) ABSTRACT

A digital living network alliance (DLNA) device. The DLNA device includes a communication interface to search for image forming apparatuses connectable to the DLNA device using a DLNA guideline, and to search for contents provided by a web server using a (web) browser; a user interface to receive a command to print at least one of the searched contents, and to receive a selection of an image forming apparatus to perform a printing job from among the searched image forming apparatuses; a content information acquisition unit to obtain information regarding the an address of at least one content to be printed in the web server; a printing job generation unit to generate a printing job including the obtained information regarding the address of the at least one content; and a controlling unit to control the selected image forming apparatus to receive the at least one content using the information regarding the address of the at least one content and to print the content.

22 Claims, 10 Drawing Sheets

```xml
<?xml version="1,0" encoding="utf-8"?>
<s:Envelope s:encodingStyle="http://schemas.xmlsoap.org/soap/encoding/"
xmlns:s="http://schemas.xmlsoap.org/soap/envelope/">
  <s:Body>
    <u:CreateJobV2 xmlns:u="urn:schemas-upnp-org:service:PrintEnhanced:1">
      <JobName>111</JobName>
      <JobOriginatingUserName>22</JobOriginatingUserName>
      <DocumentFormat>application/xhml-print</DocumentFormat>
      <Copies>1</Copies>
      <Sides>one-sided</Sides>
      <NumberUp>1</NumberUp>
      <OrientationRequested>portrait</OrientationRequested>
      <MediaSize>device-setting</MediaSize>
      <MediaType>device-setting</MediaType>
      <PrintQuality>normal</PrintQuality>
      <CriticalAttributesList>none</CriticalAttributesList>
    </u:CreateJobV2>
  </s:Body>
</s:Envelope>
```

```
<?xml version="1.0" encoding="UTF-8"?>
<!DOCTYPE html PUBLIC "-//W3C//DTD XHML-Print
    1.0//EN" "http://www.w3.org/MarkUP/DTD/xhtml-print10.dtd">
<html xmuns="http://www.w3.org/1999.xhtml">
<head>
<title>Bordered_3mm_Landscape_A4</title>
<style type="text/css">@media print
{
    @page {size: 297.000mm 210.000mm; margin: 3.000mm 3.000mm  3.000mm
        3.000mm;}               ← 820
}
</style>
</head>
<body style="padding:0mm;">
<div style="position:relative: page-break-after:always;">    ← 810
<img src="http://www.myPhoto.com/myson.jpg"/> </div>
</div>
</body>
</html>
```

DLNA (DIGITAL LIVING NETWORK ALLIANCE) DEVICE, METHOD AND SYSTEM FOR PRINTING CONTENT FROM WEB SERVERS

CROSS-REFERENCE TO RELATED APPLICATIONS

This application claims the benefit of Korean Patent Application No. 2009-107232, filed in the Korean Intellectual Property Office on Nov. 6, 2009, the disclosure of which is incorporated herein by reference.

BACKGROUND

1. Field

Aspects of the embodiments relate to a Digital Living Network Alliance (DLNA) device, an image forming method, and an image forming system, and more particularly, to a DLNA device which easily performs a printing job for various contents searched from Internet, an image forming method, and an image forming system.

2. Description of the Related Art

Usually, an image forming apparatus includes a device which prints print data generated by a terminal such as a computer on a printing medium. Such an image forming apparatus may be a copy machine, a printer, a fax machine, or an MFP (multifunction peripheral) which integrates functions of these in one device.

Since image forming apparatuses which have been recently introduced support the DLNA standard, the image forming apparatuses receive a printing job not only through a terminal such as a computer but also through various DLNA devices.

The DLNA is an organization of standardization of digital information technology founded to set the standards for compatibility of data such as music, photographic, motion pictures, and so on. The DLNA aims at establishing compatible platforms based on open standards and realizing convergence among services. The DLNA promotes introduction of the guidelines based on UpnP (Universal Plug and Play) which is widely used on many devices such as an appliance, a personal computer, a wireless communication device, and so on.

A user may use various contents on DLNA network using a DLNA device, and print the contents through an image forming apparatus connected to the DLNA network.

The DLNA device can be connected to not only DLNA network but also to an external network, for example, an internet network or a wireless network. However, it is not limited thereto. Therefore, a user may search for various contents on both the DLNA network and the external network through the DLNA device.

However, it is difficult to output contents on the external network using a conventional DLNA device. Specifically, contents have to be stored in a DMS server or in a web server of the DLNA device in order to be printed, and it is difficult for a user to perform a printing job when using the DMS server due to the complex printing procedure.

SUMMARY

Aspects of the embodiments relate to a Digital Living Network Alliance (DLNA) device which easily performs a printing job for various contents searched from a network such as the Internet, an image forming method, and an image forming system.

According to an aspect, there is provided a Digital Living Network Alliance (DLNA) device connectable to a (web) server using a wire or a wireless network, including a communication interface to search for image forming apparatuses connectable to the DLNA device using a DLNA, and to search for contents provided by the (web) server using a (web) browser; a user interface to receive a command to print at least one of the searched contents found in the search, and to receive a selection of an image forming apparatus to perform a printing job from among the searched image forming apparatuses; a content information acquisition unit to obtain information regarding an address (a location) of at least one content to be printed in the (web) server; a printing job generation unit to generate a printing job including the obtained information regarding the address (the location) of the at least one content; and a controlling unit to control the selected image forming apparatus to receive the at least one content using the information regarding the address (location) of the at least one content and to print the content.

According to another aspect, the content information acquisition unit may obtain information regarding the addresses (locations) of the contents using at least one of information regarding an address (location) of a web page including the at least one content and information regarding an address (location) of a (web) server storing the web page.

According to another aspect, the printing job generation unit may generate extensible hypertext markup language (XHTML) data including the information regarding the address (location) of the at least one content.

According to another aspect, the user interface may receive a setting of a print option for the at least one content to be printed, and the printing job generation unit may generate a printing job in a manner of applying a print option for the contents commanded to be printed.

According to another aspect, the user interface may receive a selection of at least one of a plurality of pre-stored templates, and the printing job generation unit may generate a printing job in a manner of applying the at least one content commanded to be printed to the selected template.

According to another aspect, a storage unit may store a printing job to which the template is applied, and if there is a template being used, the printing job generation unit may generate a printing job in a manner of applying the contents commanded to be printed to the template.

According to another aspect, if there is a template being used, the controlling unit may control the user interface to display the template being used.

According to another aspect, the user interface may receive a print command using a setting menu corresponding to the selected contents.

According to another aspect, there is provided an image forming method on a Digital Living Network Alliance (DLNA) device connectable to a (web) server using a network, the image forming method including searching for contents provided by the (web) server using a (web) browser; receiving a command to print at least one of the searched contents found in the search; searching for image forming apparatuses connectable to the DLNA device using a DLNA; receiving a selection of an image forming apparatus to perform a printing job from among the searched image forming apparatuses; obtaining information regarding the address of at least one content to be printed in the (web) server; generating a printing job including the obtained information regarding the address (location) of the at least one content; and transmitting the generated printing job to the image forming apparatus so that the selected image forming apparatus receives and prints the at least one content using the information regarding the address (location) of the at least one content.

According to another aspect, the obtaining may obtain the information regarding the address of the content using at least one of information regarding the address of a web page including the at least one content, information regarding the address (location) of the content, and information regarding the address (location) of a (web) server storing the (web) page.

According to another aspect, the generating may generate extensible hypertext markup language (XHTML) data including the information regarding the address (location) of the at least one content.

According to another aspect, the image forming method may further include setting a print option for the at least one content to be printed, wherein the generating may generate a printing job in a manner of applying a print option for the contents commanded to be printed.

According to another aspect, the image forming method may further include selecting at least one of a plurality of pre-stored templates, wherein the generating may generate a printing job in a manner of applying the at least one content commanded to be printed to the selected template.

According to another aspect, the image forming method may further include storing a printing job to which the template is applied, wherein the generating, if there is a template being used, may generate a printing job in a manner of applying the contents commanded to be printed to the template being used.

According to another aspect, the image forming method may further include, if there is a template being used, displaying the template being used.

According to another aspect, the receiving may receive a print command using a setting menu corresponding to the selected contents.

According to another aspect, if the generated printing job is received, the image forming apparatus may request the (web) server to transmit the contents using the information regarding the (locations) (addresses) of the contents included in the printing job.

According to another aspect, there is provided an image forming system including a (web) server to include at least one content; a Digital Living Network Alliance (DLNA) device connected to the (web) server through a network, to search for the contents provided by the (web) server using a (web) browser, and to generate a printing job including information regarding the location (address) of the at least one of the searched contents; and an image forming apparatus connected to the DLNA device using a DLNA, if a printing job is received from the DLNA device, to receive the contents from the web server using the information regarding the addresses of the contents included in the printing job, and to print the contents.

According to another aspect, the DLNA device may obtain information regarding the locations (addresses) of the contents using at least one of information regarding an location (address) of a (web) page including the at least one content, information regarding the addresses of the contents, and information regarding an address of a web server storing the web page.

According to another aspect, the DLNA device may search for the image forming apparatus using a DLNA and generate a printing job for the searched image forming apparatuses.

Additional aspects and/or advantages of the embodiments will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Reference will now be made in detail to the exemplary embodiments, examples of which are illustrated in the accompanying drawings, wherein like reference numerals refer to like elements throughout. The embodiments are described below, in order to explain them by referring to the figures.

Figure 1:
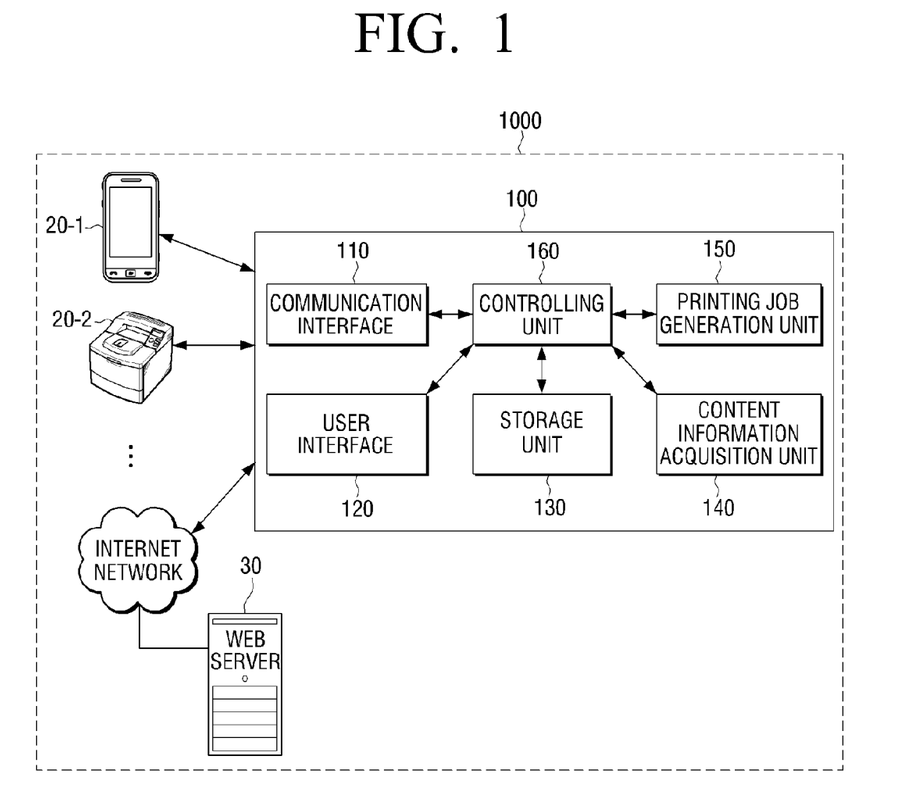
FIG. 1 is a block diagram of an image forming system according to an exemplary embodiment of the present invention.

FIG. 1 is a block diagram of an image forming system according to an exemplary embodiment of the present invention.

Referring to FIG. 1, an image forming system 1000 includes digital living network alliance (DLNA) devices 100, 20-1, 20-2, . . . , and a (web) server 30.

It is noted that the DLNA device is a DLNA compliant device.

The DLNA device 100 is connected to the (web) server 30 via a network (Internet), searches for contents provided by the (web) server 30 using a browser, and generates a printing job including information regarding a location (address) of at least one of the searched contents found in the search.

The DLNA device 100 is connected to other DLNA devices 20-1, 20-2, . . . using a DLNA standard, and transmits the generated printing job to another DLNA device, for example, the image forming apparatus 20-2.

The DLNA device 100 may share its contents with the other DLNA devices 20-1. 20-2. on DLNA network, connect to a DLNA image forming apparatus on the DLNA network, and output contents. For example, the DLNA device may be one of a digital media server (DMS), a digital media player (DMP), and a digital media renderer (DMR). Herein, the DMS performs the function of a media server device (MSD) in an area of UPnP AV, that is the function of providing digital media contents, and searches for items of the digital media contents in the DMS so that a user using the DLNA network displays or divides contents. For example, the DMS may include a video cassette recording (VCR) device, a compact disc (CD) player, a digital versatile disc (DVD) player, an MPEG layer 3 (MP3) player, a settop box (STB), a television (TV) tuner, a radio tuner, a personal computer (PC), and so on. The DMR executes the selected media, and includes a TV, a stereo speaker, and so on. The DMP is a DMR including a UPnP control point (CP), and performs the functions of a media renderer device (MRD) and a media render control point (MRCP). That is, the DMP selects media contents and controls the selected media contents to be executed.

Specifically, the DLNA device 100 includes a communication interface 110, a user interface 120, a storage unit 130, a content information acquisition unit 140, a printing job generation unit 150, and a controlling unit 160.

The communication interface 110 is connected to a DLNA network, and shares contents with the other DLNA devices 20-1, 20-2, . . . on the DLNA network. In more detail, the communication interface 110 may communicate with the other DLNA devices 20-1, 20-2, . . . on the DLNA network according to the UPnP protocol, for example, and share contents stored in the other DLNA devices 20-1, 20-2, . . . .

If a user inputs a print command, the communication interface 110 may search for the image forming apparatus 20-2 connected to the DLNA network, and control the user interface 120 to display the searched image forming apparatus 20-2. If the user selects the image forming apparatus 20-2 to perform a printing job, the communication interface 110 may request the image forming apparatus 20-2 on the DLNA network to perform the printing job according to the DLNA standard and the DLNA printer protocol, and receive a job identification (ID) corresponding to the printing job, a uniform resource locator (URL) address to which print data is transmitted, and so on from the image forming apparatus 20-2. The communication interface 110 may transmit print data generated by the printing job generation unit 150 which will be explained later to the image forming apparatus 20-2.

The communication interface 110 is connected to an Internet network, and is connected to the web server 30 on the Internet network. In more detail, the communication interface 110 may be connected to the web server 30, for example, a web page or a file transfer protocol (FTP) server, on the Internet network through an external gateway, and receive various contents and information regarding the addresses of the contents from the web server 30. The communication interface 110 may be connected to the Internet network over wire or wirelessly, or may be connected to the Internet network through other DLNA devices connected to the Internet network. In this exemplary embodiment of the present invention, the single communication interface 110 is connected to both the Internet network and the DLNA network. However, a plurality of communication interfaces may be provided and thus each of the communication interfaces may be connected to either the Internet network or the DLNA network.

Herein, the contents may be image data, text data, HTML documents, or a file capable of direct printing on an image forming apparatus. The direct printing refers to the ability to perform a printing job only by transmitting a file to an image forming apparatus without additionally converting the file. The direct printing is supported on the files such as a JPG, PDF, XPS, and so on. The information regarding the addresses of the contents refers to information regarding an address on a web server where contents are stored.

The user interface 120 includes a plurality of function keys using which a user sets or selects various functions supported by the DLNA device 100, and displays various information provided by the DLNA device 100. The user interface 120 may be implemented as a device, such as a touch pad, which is configured to support concurrent input and output, or a device combining functions of a mouse and a monitor.

The user interface 120 displays the searched image forming apparatus 20-2. Specifically, the user interface 120 may display image forming apparatuses that the communication interface 110 searches for on the DLNA network, and one 20-2 of the image forming apparatuses may be selected by a user as an image forming apparatus to perform a printing job.

The user interface 120 may display contents provided by the web server 30 through a user interface window. A user may search for a web page and various contents included in the web page using a web browser displayed on the user interface 120. The user selects contents desired to be printed from among contents displayed on the user interface window, and inputs a print command. Specifically, the user interface 120 provides a context menu to receive a print command, and thus a user may conveniently input a command to print the contents by clicking a corresponding button. Herein, the context menu is a tooltip to receive various commands for the current contents, wherein the tooltip refers to or is annotated information which appears when a user presses a right button of a mouse.

A user may select a print option for the contents and whether or not to apply a template using the user interface 120. Specifically, if a user selects an application of a template, the user interface 120 may display various templates stored in the storage unit 130. Therefore, a user may select a template to be applied to the corresponding contents from among various templates displayed on the user interface 120. If the template selected by the user can be applied to a plurality of contents, the user interface window described above may be displayed so that the user may continue to select contents. If the user selects additional contents, the user interface 120 may display previously used templates. Therefore, the user may easily select a layout for contents to be output, and may also set layouts for the plurality of contents.

The storage unit 130 stores a plurality of templates which are written as extensible hypertext markup language (XHTML) print data. The storage unit 130 may temporarily store print data to be generated by the printing job generation unit 150 and a template to which a part of currently used contents is applied. The storage unit 130 may be implemented as a storage medium in the image forming apparatus 100 and/or an external storage medium, such as a removable hard disc and a universal serial bus (USB) memory.

Herein, the template may be generated for the purpose of being combined with image data provided to an image forming apparatus, or may be an image which is generated in the DLNA device 100. That is, various templates may exist for each type of contents.

The content information acquisition unit 140 obtains information regarding an address of a web server having contents which receive a print command. In more detail, the content information acquisition unit 140 may obtain information of a web server having the contents by combining information regarding an address of a web page including contents which a user is searching for with information on the contents. For example, if a user inputs a command to print an image 510 illustrated in FIG. 5, the content information acquisition unit 140 combines an address 'www.myphoto.com' of a web server storing the image 510 with a file name 'myson.jpg' of the contents, and obtains 'www.myphoto.com/myson.jpg' as information regarding the addresses of the contents.

In this exemplary embodiment, information regarding the addresses of only contents that a user inputs a command to print is obtained. However, alternate exemplary embodiments of the present invention may be implemented in such a manner that information regarding the addresses of all of the contents is obtained before a print command is input, and the content information acquisition unit 140 transmits information regarding the addresses of the only contents which a user inputs a command to print to the printing job generation unit 150.

Figure 8:
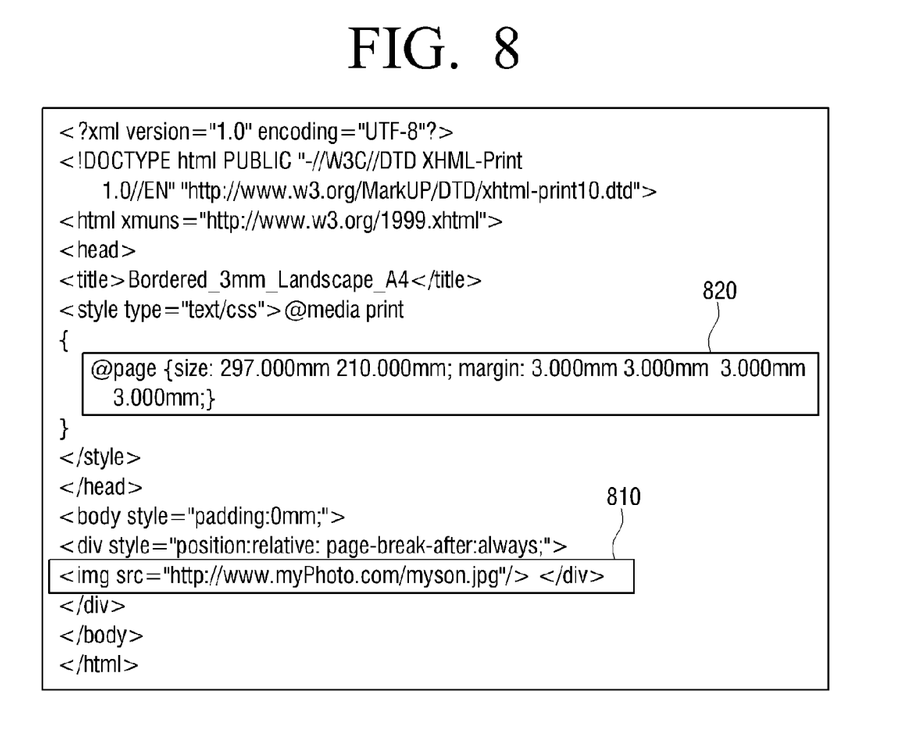
FIG. 8 is a view of an example of print data written in extensible hypertext markup language (XHTML) generated according to an exemplary embodiment of the present invention.

The printing job generation unit 150 generates a printing job using the obtained information regarding an address of a web server. In more detail, if a user inputs a print command, the printing job generation unit 150 receives information regarding addresses of contents from the content information acquisition unit 140, and generates XHTML print data including the information regarding the addresses of contents. For example, if the printing job generation unit 150 receives address information 'www.myphoto.com/myson.jpg' from the content information acquisition unit 140, the printing job generation unit 150 may generate XHTML print data as shown in FIG. 8. Referring to FIG. 8, 'www.myphoto.com/myson.jpg' is written as source information 810 of the contents.

The printing job generation unit 150 may generate a printing job by applying a print option input through the user interface 120 to contents. In more detail, the printing job generation unit 150 may generate XHTML print data so that a print option input by a user through the user interface 120 is applied to contents and thus the contents are output, and the print option input by the user is included in the XHTML print data. For example, as shown in FIG. 8, the printing job generation unit 150 generates XHTML print data to include information regarding a printing medium option 820.

The printing job generation unit 150 generates a printing job by applying a template selected by a user to contents to be printed. In more detail, if a user selects a template for the contents using the user interface 120, the printing job generation unit 150 may add information regarding an address of a web server having the contents and a print option to the template in order to output the contents to which the template selected by the user is applied. If it is possible for the template selected by the user to include a plurality of contents, the printing job generation unit 150 may control the user interface 120 to display a user interface window through which a plurality of contents are selected, and information regarding the addresses of the plurality of contents may be added to the template. If a command to print a plurality of contents is input, it may be implemented to add information regarding the addresses of the contents to the template including the plurality of contents.

The controlling unit 160 transmits the generated printing job to the image forming apparatus 20-2 and thus the image forming apparatus 20-2 prints contents corresponding to information regarding the address of the web server 30. In more detail, the controlling unit 160 may control the communication interface 110 to transmit print data generated by the printing job generation unit 150 to the image forming apparatus 20-2 on DLNA network so that the image forming apparatus 20-2 prints the generated print data. The operation of this embodiment will be explained later in detail with reference to FIG. 2.

The controlling unit 160 displays a preview image of the generated print data. Specifically, the controlling unit 160 may control the user interface 120 to display a preview image of the generated print data so that a user can visually check the output of the contents in advance.

The controlling unit 160 stores the generated print data in the storage unit 130. In more detail, since the same contents can be printed repeatedly, the controlling unit 160 stores print data for the contents in the storage unit 130, and thus quickly performs a printing job using the pre-stored print data if a command to print the same contents is input again. In addition, if a template to be applied to a plurality of contents is used, the controlling unit 160 may store a printing job to which the template is applied whenever a single content is applied to the template, and controls the user interface 120 to display the previously used template.

The image forming apparatus 20-2 is a DLNA device, and is connected to the DLNA device 100 using a DLNA standard. If the image forming apparatus 20-2 receives a printing job from the DLNA device 100, the image forming apparatus 20-2 may receive contents from the web server 20 using information regarding the addresses of the contents included in the printing job, and perform the printing job on the contents. Specifically, the image forming apparatus 20-2 may be a copy machine, a printer, a fax machine, or a multifunction peripheral (MFP) which integrates functions of these in one device, and performs printing based on the printing job received from the DLNA device 100 and the contents received from the web server 30.

The web server 30 includes at least one content, and is connected to the DLNA device 100 and the image forming apparatus 20-2 via Internet. Specifically, if the web server 30 receives the request for contents from the DLNA device 100 or the image forming apparatus 20-2, the web server 30 may provide the contents and information on the contents to the DLNA device 100 or the image forming apparatus 20-2.

A printing job is performed for a single content, whereas printing jobs may be performed for a plurality of contents concurrently or sequentially.

The DLNA device 100 according to this exemplary embodiment of the present invention provides a user with a context menu to input a print command, and thus the user may input a command to print contents using the context menu. Therefore, user's convenience is improved. As the DLNA device 100 performs a printing job in such a manner of transmitting information regarding addresses of contents and information regarding a print option to the image forming apparatus 20-2, the DLNA device 100 may perform the printing job for a plurality of image forming apparatuses without installing drivers corresponding to each image forming apparatus.

Figure 2:
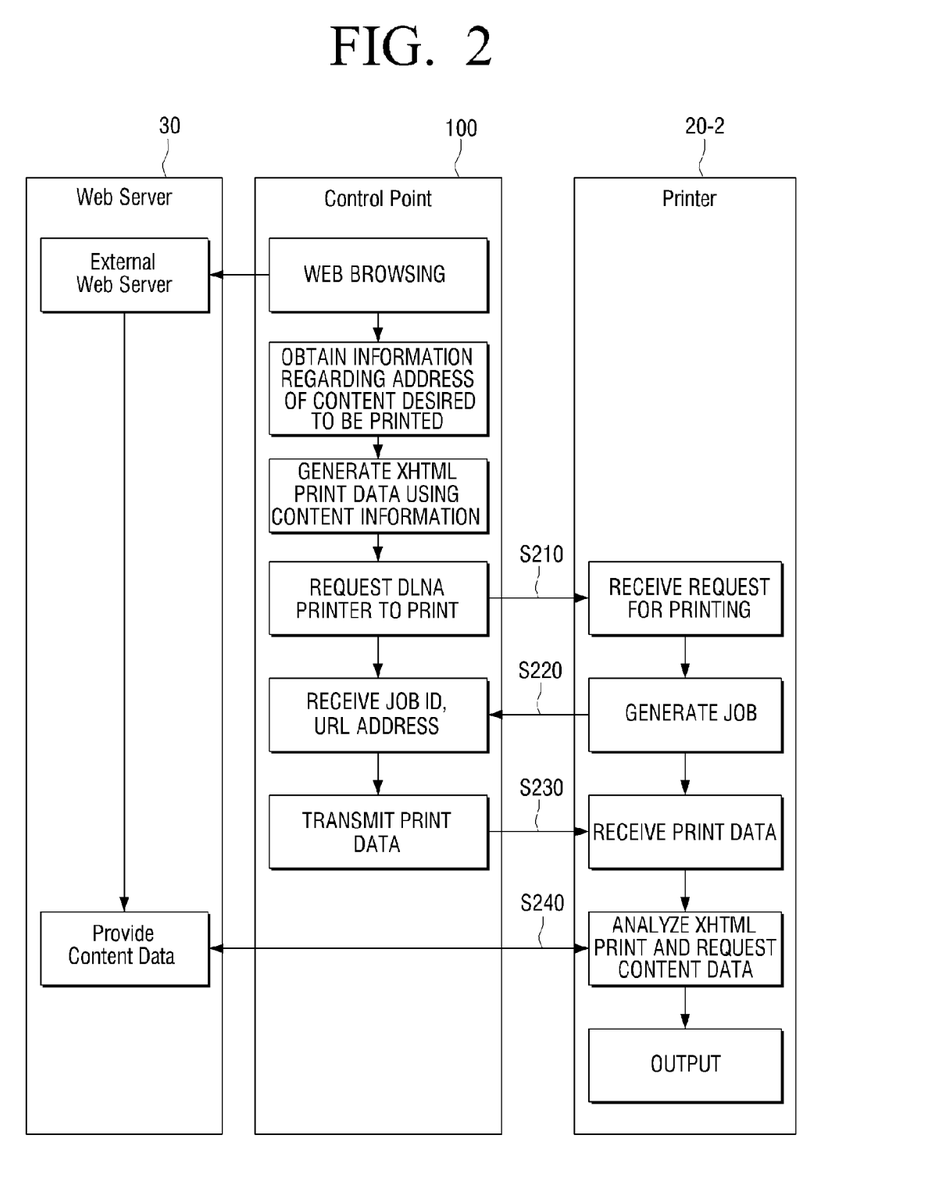
FIG. 2 is a view provided to explain the operation of a Digital Living Network Alliance (DLNA) device according to an exemplary embodiment of the present invention.

FIG. 2 is a view provided to explain the operation of a Digital Living Network Alliance (DLNA) device according to an exemplary embodiment of the present invention.

Referring to FIG. 2, the DLNA device 100 may display various contents that the web server 30 on the Internet network includes, and a user may search for various contents through a web browser. If a command to print at least one of the displayed contents is received from the user, the DLNA device 100 may obtain information regarding an address of a web server having the contents. Specifically, the DLNA device 100 may obtain an address of a web server having the contents by combining the address of the web page having the contents with the file name of the contents.

The DLNA device 100 generates a printing job using the obtained address of the web server having the contents, and performs DLNA printing according to the generated printing job. Specifically, in the DLNA printing, the image forming apparatus 20-2 is requested to perform a printing job in operation S210, which is different from the operation of a usual local type printer. If it is requested to perform the printing job, the image forming apparatus 20-2 notifies the DLNA device 100 of a job ID corresponding to the printing job and a URL address to receive print data in operation S220, and the DLNA device 100 transmits the generated print data to the URL address in operation S230.

The image forming apparatus 20-2 analyzes the received print data in a manner of parsing, requests the web server 30 having the content data to transmit the content data using information regarding the addresses of the contents included in the print data in operation S240, and receives the content data from the web server 30. The image forming apparatus 20-2 performs the printing job using the content data received from the web server 30 and the print data received from the DLNA device 100.

As described above, since the DLNA device 100 according to the exemplary embodiment of the present invention performs a printing job in a manner of transmitting information regarding the addresses of the contents and information regarding the print option to the image forming apparatus 20-2, the DLNA device 100 may easily perform a printing job for a plurality of image forming apparatuses without installing drivers corresponding to each image forming apparatus.

Figure 4:
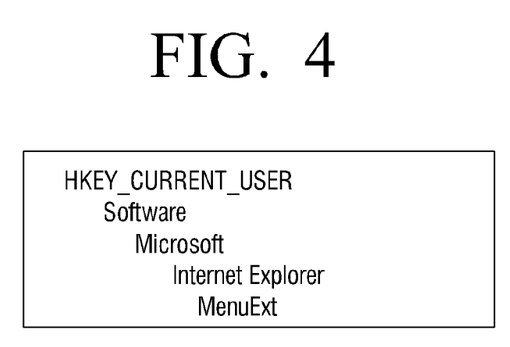
FIG. 4 is a view of registry information to add a printing menu, according to an exemplary embodiment of the present invention.

FIG. 4 is a view of registry information to add a printing menu, according to an exemplary embodiment of the present invention.

Internet Explorer of a window which is an example of a content browser may extend a context menu by adding registry information as shown in FIG. 4. The context menu is a tooltip which is generated when a user presses a right or left button of a mouse while placing the mouse on contents. If the registry information is added as shown in FIG. 4, a 'Print to DLNA' menu 521 may be added as shown in FIG. 6.

If a browser or an operating system (OS) does not support the type of a context menu, a command to print contents may be input using an application of the type of plug-in or widget.

As described above, since the DLNA device 100 according to the exemplary embodiment of the present invention provides a context menu to readily receive a command to print searched contents, a user conveniently performs the command to print contents on the Internet.

Figure 5:
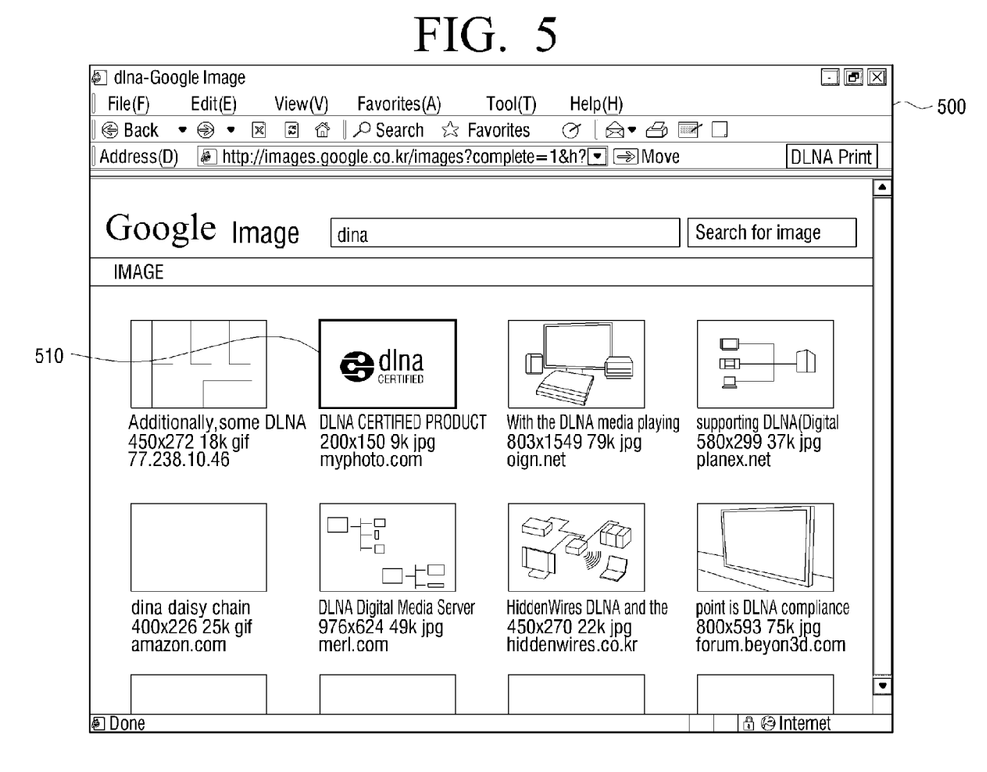
FIGS. 5 to 7 are views of various examples of a user interface (UI) window displayed on a user interface, according to an exemplary embodiment of the present invention.
Figure 6:
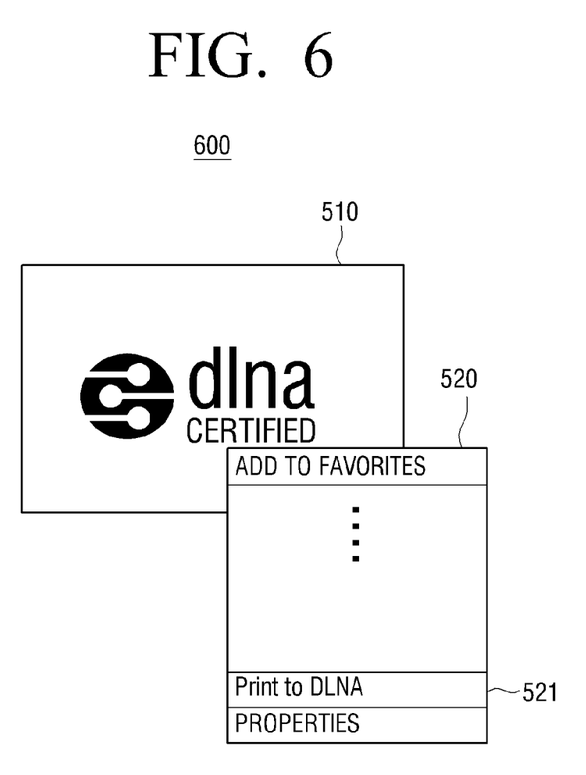
Figure 7:
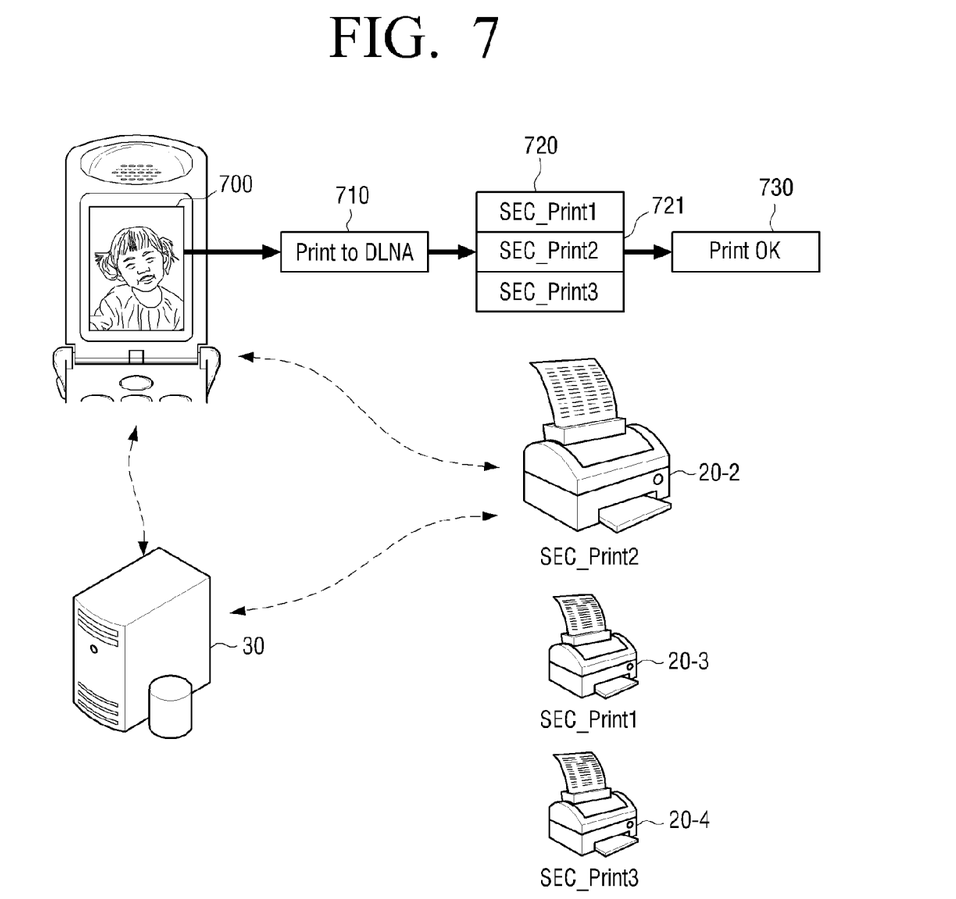

FIGS. 5 to 7 are views illustrating various user interface (UI) windows displayed on a user interface according to exemplary embodiments of the present invention.

FIG. 5 shows an example of a UI window 500 which displays various contents provided by a web server using a browser. If a user desires to print an image 510 among various contents, the user may place a mouse on the image 510 and input a command to display a context menu. For example, a command to display a context menu may be the operation of inputting a right or left button of a mouse on a corresponding image.

FIG. 6 shows an example of a UI window displayed when a user inputs a command to display a context menu on the image 510 illustrated in FIG. 5. Referring to FIG. 6, a menu list 520 for the contents is displayed, and the 'Print to DLNA' menu 521 among the menu list 520 is displayed. Through the menu list 520, a user may input a command to print the corresponding contents conveniently.

FIG. 7 shows an example of a UI window displayed when a user selects the 'Print to DLNA' menu 710 also illustrated in FIG. 6. Referring to FIG. 7, the DLNA device 700 displays 720 the image forming apparatuses 20-2, 20-3, 20-4 which communicate with the DLNA device 700 using a DLNA standard, and a user may select 721 one of the image forming apparatuses 20-2, 20-3, 20-4 to perform a printing job. If a user selects 721 the image forming apparatus 20-2, the image forming apparatus 20-2 may perform the printing job 730 which has been explained with reference to FIGS. 1 and 2. While a plurality of image forming apparatuses are connected to DLNA network in FIG. 7, a single image forming apparatus may be connected to the DLNA network. If a single image forming apparatus is connected to DLNA network, the DLNA device 700 may omit receiving a selection of one of the plurality of image forming apparatuses when performing a printing job, or one of the image forming apparatuses may be previously set as a default apparatus. Alternatively, after a user selects an image forming apparatus, a UI window on which a user sets a print option for contents or a UI window on which a user applies a template may be displayed.

Figure 9:
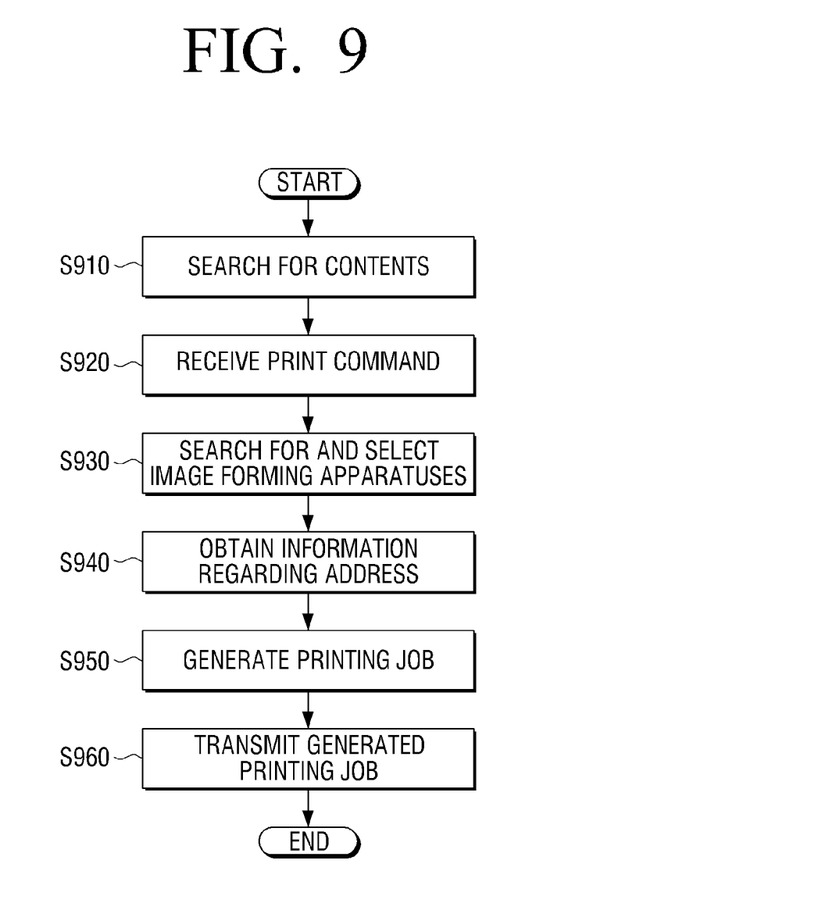
FIG. 9 is a flowchart of the image forming method according to an exemplary embodiment of the present invention.

FIG. 9 is a flowchart of the image forming method according to an exemplary embodiment of the present invention.

The DLNA device 100 may display various contents provided by a web server 30 using a web browser. A user may search for various contents through a UI window of the DLNA device 100 in operation S910, the DLNA device 100 may receive a print command for at least one of the searched contents in operation S920. The command to print the contents may be received through a context menu. The context menu has been explained with reference to FIGS. 1 to 6, and thus detailed description will be omitted.

If a print command is received, the DLNA device 100 searches for image forming apparatuses connectable to the DLNA device 100 over DLNA network, and receives one of the searched image forming apparatuses by a selection of a user in operation S930. In this exemplary embodiment of the present invention, image forming apparatuses are searched and selected if a print command is received from a user, but the process of searching for and selecting image forming apparatuses may be performed prior to operation S910.

If an image forming apparatus is selected, the DLNA device 100 obtains information regarding an address of a web server for contents that a command to print is input in operation S940. In more detail, the DLNA device 100 may obtain information regarding the address of a web page having contents by combining a web page having the contents being currently searched with information on the contents. For example, if a user inputs a command to print contents of file 'myson.jpg' on a web page having an address 'www.myphoto.com,' the DLNA device 100 may obtain 'www.myphoto.com/myson.jpg' as information regarding the addresses of the contents. In this exemplary embodiment of the present invention, a user inputs a print command and then information regarding addresses of contents is obtained. However, information regarding addresses of a plurality of contents may be obtained while a user searches for contents, and if the user inputs a command to print contents, the DLNA device 100 may use only information regarding the addresses of the contents that the user inputs to print.

A printing job may be generated using the obtained information regarding the address of a web server in operation S950. The process of generating a printing job will be explained later in detail with reference to FIG. 10.

If a printing job is generated, the DLNA device 100 transmits the generated printing job to an image forming apparatus in operation S960. The detailed process of transmitting a printing job has been explained with reference to FIG. 2, and thus detailed explanation thereof will be omitted.

Figure 10:
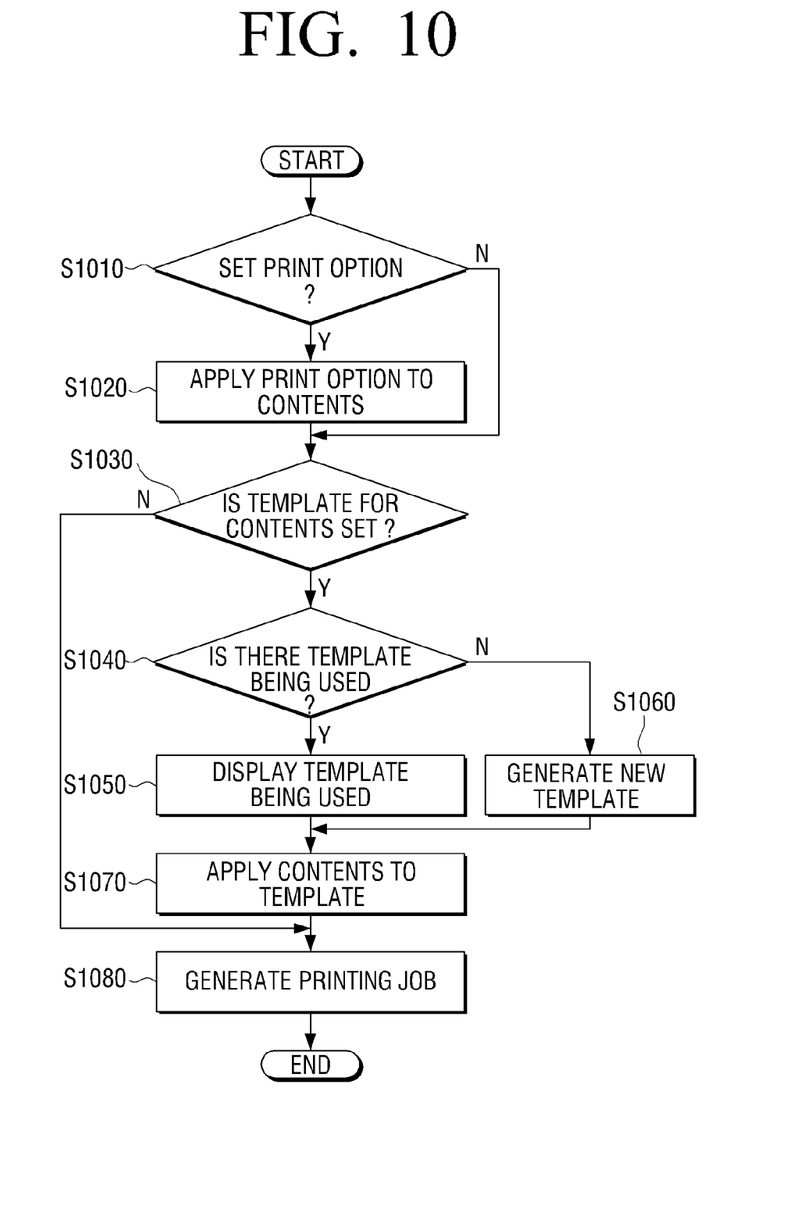
FIG. 10 is a flowchart of the process of generating a print job of FIG. 9.

FIG. 10 is a flowchart of the process of generating a print job of FIG. 9.

If information regarding the addresses of the contents is obtained, the DLNA device 100 may recognize if a user sets a print option for the contents in operation S1010. In more detail, if a user sets a print option for the contents, the set print option is added to XHTML data including information regarding the addresses of the contents, and thus a printing job to which the print option is applied may be generated in operation S1020.

The DLNA device 100 may recognize if a user sets a template for the contents in operation S1030. In more detail, if a user sets a template for the contents, the DLNA device 100 checks if there is a template which is being used in operation S1040, and if there is a template being used, the DLNA device 100 may add information regarding the addresses of the contents that a user inputs a command to print and information on the print option to the template. In this situation, the DLNA device 100 may display that there is a template being used in operation S1050, and thus the user may determine whether to perform a printing job using the template or not, or select addresses of contents which will be newly added within the template.

If there is no template being used, a new template may be generated in operation S1060. In more detail, if there is no template being used, a plurality of pre-stored templates are displayed and thus a user may select one of the templates.

Figure 3:
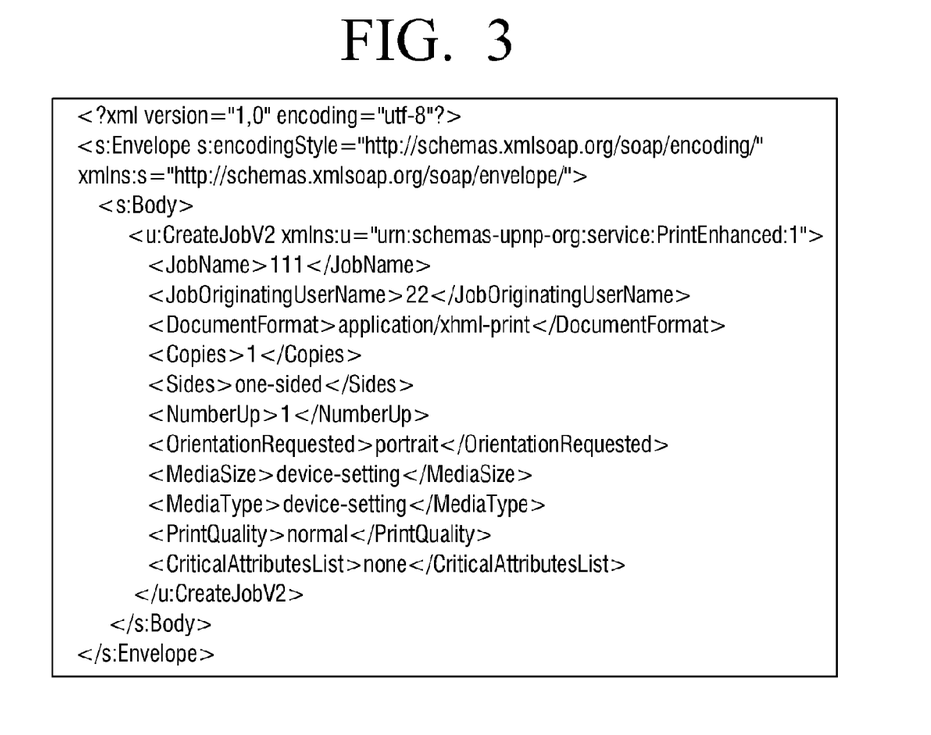
FIG. 3 is a view of a print job request command to be transmitted to an image forming apparatus, according to an exemplary embodiment of the present invention.

The DLNA device 100 applies information regarding the addresses of the contents to the template selected by the user or the template newly generated in operation S1070, and generates a printing job in operation S1080 (see FIG. 3).

Since the image forming method according to the exemplary embodiment of the present invention provides a context menu through which a user inputs a command to print the contents easily, the user can print the searched contents conveniently. In addition, since a printing job is performed only by transmitting information regarding the addresses of the contents and information on a print option to the image forming apparatus 20-2, the printing job for a plurality of image forming apparatuses may be performed without installing drivers corresponding to each image forming apparatus. The image forming method explained with reference to FIGS. 9 and 10 may be performed on the DLNA device 100 having the structure illustrated in FIG. 1, and may also be performed on the image forming apparatus having other structures.

Although a few embodiments have been shown and described, it would be appreciated by those skilled in the art that changes may be made in this embodiment without departing from the principles and spirit of the invention, the scope of which is defined in the claims and their equivalents.

What is claimed is:

1. A Digital Living Network Alliance (DLNA) device connected to a web server using the Internet, comprising:
    a communication interface to search for image forming apparatuses connected to the DLNA device, and to search for contents provided by the web server using a web browser;
    a user interface to receive, from a user, a command to print at least one of the searched contents found by the search for contents provided by the web server, and to receive a selection, from the user, of an image forming apparatus from among the searched image forming apparatuses found by the search for image forming apparatuses, and to receive a second selection, from the user, of at least one of a plurality of pre-stored templates;
    a content information acquisition unit, which upon receiving the command to print, determines if at least one of the plurality of pre-stored templates is selected to be used for printing, and when it is determined that no pre-stored template is selected then the content information acquisition unit controls the user interface to receive the second selection of the at least one of the plurality of pre-stored templates,
    wherein the content information acquisition unit obtains information of an address of the at least one content commanded to be printed, obtains information of a file name of the at least one content commanded to be printed, and combines the address and the file name of the at least one content commanded to be printed;
    a printing job generation unit to generate a printing job by adding to the selected at least one of the plurality of pre-stored templates the combined information of the address and of the file name of the at least one content commanded to be printed; and
    a controlling unit to control the communication interface to transmit the generated print job to the selected image forming apparatus, to control the selected image forming apparatus to retrieve over the Internet from the web server the at least one content commanded to be printed by using the combined information of the address and of the file name of the at least one content commanded to be printed, and to control the selected image forming apparatus to print the generated print job using the selected at least one of the plurality of pre-stored templates and using the retrieved at least one content,
    wherein the controlling unit provides a preview image of the generated print job.

2. The DLNA device according to claim 1, wherein the content information acquisition unit obtains information regarding the addresses of the contents using at least one of information regarding an address of a web page including the at least one content and information regarding an address of a web server storing the web page.

3. The DLNA device according to claim 1, wherein the printing job generation unit generates extensible hypertext markup language (XHTML) data including the information regarding the address of the at least one content.

4. The DLNA device according to claim 1, wherein the user interface receives a setting of a print option for the at least one content to be printed, and the printing job generation unit generates a printing job in a manner of applying a print option for the contents commanded to be printed.

5. The DLNA device according to claim 1,
    wherein the user interface receives a selection of at least one of a plurality of pre-stored templates,
    wherein the printing job generation unit generates a printing job in a manner of applying the at least one content, and
    wherein the controlling unit provides the selected at least one of the plurality of pre-stored templates to the selected image forming apparatus and controls the selected image forming apparatus to print the at least one content based on the selected at least one of the plurality of pre-stored templates.

6. The DLNA device according to claim 5, wherein a storage unit stores a printing job to which the template is applied, and if there is a template being used, the printing job generation unit generates a printing job in a manner of applying the contents commanded to be printed to the template being used.

7. The DLNA device according to claim 6, wherein if there is a template being used, the controlling unit controls the user interface to display the preview image of the generated print job based on the template being used.

8. The DLNA device according to claim 1,
    wherein the user interface receives a print command using a setting menu corresponding to the selected contents.

9. The DLNA device according to claim 1,
    wherein the user interface receives a selection of at least one of a plurality of pre-stored templates, wherein the printing job generation unit generates a printing job including the obtained information regarding the address of the at least one content and the selected at least one of the plurality of pre-stored templates, wherein the controlling unit provides the generated printing job to the selected image forming apparatus to control the selected image forming apparatus to print the at least one content based on the generated print job, including the obtained information regarding the address of the at least one content and the selected at least one of the plurality of pre-stored templates, and the received at least one content from the web server, received by the image forming device.

10. The DLNA device according to claim 1, wherein the content information acquisition unit obtains information regarding the file extension of the at least one content, and combines the web address page corresponding to the at least one content, the file name of the at least one content, and a file extension corresponding to the at least one content, and wherein the controlling unit is to provide information to display the preview image of a generated print job including the combination of the obtained information regarding the web address, the file name, and the file extension corresponding to the at least one content.

11. An image forming method on a Digital Living Network Alliance (DLNA) device connected to a web server using the Internet, the image forming method comprising:

searching for contents provided by the web server using a web browser;

receiving, from a user, a command to print at least one of the searched contents found by searching for contents provided by the web server;

searching for image forming apparatuses connected to the DLNA device;

receiving a selection of an image forming apparatus, from among the image forming apparatuses found by the searching, to perform the command to print;

determining if at least one of a plurality of pre-stored templates is selected to be used for printing;

if no template is determined to be used for printing, selecting at least one of the plurality of pre-stored templates to be used for printing;

obtaining information of an address of the at least one content commanded to be printed from the web server;

obtaining information of a file name of the at least one content commanded to be printed from the web server;

generating a printing job by adding to the selected at least one of the plurality of pre-stored templates a combination of the obtained information of the file name and of the address of the at least one content commanded to be printed;

transmitting the generated printing job, including the selected at least one of the plurality of pre-stored templates and the obtained information of the address and of the file name of the at least one content commanded to be printed, to the selected image forming apparatus to control the selected image forming apparatus to retrieve, over the Internet from the web server, the at least one content commanded to be printed by using the obtained information of the address and of the file name of the at least one content; and displaying a preview image of the generated print job.

12. The image forming method according to claim 11, wherein the obtaining obtains the information regarding the address of the content using at least one of information regarding the address of the web page including the at least one content, information regarding the address of the content, and information regarding the address of a web server storing the web page.

13. The image forming method according to claim 11, wherein the generating generates extensible hypertext markup language (XHTML) data including the information regarding the address of the at least one content.

14. The image forming method according to claim 11, further comprising:

setting a print option for the at least one content to be printed, wherein the generating generates a printing job in a manner of applying a print option for the contents commanded to be printed.

15. The image forming method according to claim 11, further comprising:

selecting at least one of a plurality of pre-stored templates, wherein the generating generates a printing job in a manner of applying the at least one content commanded to be printed to the selected template including the file name and the address of the at least one content, and wherein the transmitting further includes transmitting the selected template to the selected image forming apparatus and controlling the selected image forming apparatus to print the at least one content based on the selected template.

16. The image forming method according to claim 15, further comprising:

storing a printing job to which the template is applied, wherein the generating, if there is a template being used, generates a printing job in a manner of applying the contents commanded to be printed to the template being used.

17. The image forming method according to claim 16, further comprising:

if there is a template being used, displaying the preview image of the generated print job based on the template being used.

18. The image forming method according to claim 11, wherein the receiving receives a print command using a setting menu corresponding to the selected contents.

19. The image forming method according to claim 11, wherein if the generated printing job is received, the image forming apparatus requests the web server to transmit the contents using the information regarding the addresses of the contents included in the printing job.

20. An image forming system including an image forming apparatus and a Digital Living Network Alliance (DLNA) device, comprising:

the DLNA device connected to a web server through the Internet, to search for contents provided by the web server using a web browser, to receive, from a user using a user interface (UI) of the DLNA device, a command to print at least one of the contents found by the search for contents provided by the web server, to receive a selection, from the user via the UI, of the image forming apparatus from among image forming apparatuses found by a search for the image forming apparatuses performed by the DLNA device, to determine if at least one of the plurality of pre-stored templates is selected to be used for printing, and when it is determined that no pre-stored template is selected then to receive a second selection, from the user using the UI, of at least one of a plurality of pre-stored templates, to obtain an address and a file name of the at least one of the contents commanded to be printed, to combine the address and the file name of the at least one of the contents commanded to be printed, and to generate a printing job by adding to the selected at least one of the plurality of pre-stored templates the combined address and file name of the at least one of the contents commanded to be printed;

the image forming apparatus selected by the user connected to the DLNA device, wherein if the generated printing job is received from the DLNA device including the information of the address and of the file name and the selected at least one of the plurality of pre-stored templates, to retrieve over the Internet from the web server the at least one of the contents commanded to be printed based on the information of the address and the file name included in the generated printing job, and to print the at least one of the contents commanded to be printed using the selected at least one of the plurality of pre-stored templates; and a controlling unit to provide a preview image of the generated print job.

21. The image forming system according to claim 20, wherein the DLNA device obtains information regarding the addresses of the contents using at least one of information regarding the address of a web page including the at least one content, information regarding the addresses of the contents, and information regarding the address of a web server storing the web page.

22. The image forming system according to claim 20, wherein the DLNA device searches for the image forming apparatus using a DLNA guideline and generates a printing job for the searched image forming apparatuses.

* * * * *

UNITED STATES PATENT AND TRADEMARK OFFICE
CERTIFICATE OF CORRECTION

| | | |
|---|---|---|
| PATENT NO. | : 8,934,120 B2 | Page 1 of 1 |
| APPLICATION NO. | : 12/784017 | |
| DATED | : January 13, 2015 | |
| INVENTOR(S) | : Jun-seung Lee | |

It is certified that error appears in the above-identified patent and that said Letters Patent is hereby corrected as shown below:

Title page, item (75) Inventor, Line 1

Delete "Soengnam-si" and insert --Seongnam-si--, therefor.

Title page, item (57) Abstract, Line 10

Delete "the an" and insert --the--, therefor.

Signed and Sealed this
Thirteenth Day of October, 2015

Michelle K. Lee
*Director of the United States Patent and Trademark Office*